United States Patent
Lim et al.

(10) Patent No.: US 10,333,751 B2
(45) Date of Patent: Jun. 25, 2019

(54) METHOD FOR TRANSMITTING SIGNALS IN DCM MODE IN WIRELESS LAN SYSTEM, AND DEVICE FOR SAME

(71) Applicant: LG ELECTRONICS INC., Seoul (KR)

(72) Inventors: Dongguk Lim, Seoul (KR); Jinyoung Chun, Seoul (KR); Jinsoo Choi, Seoul (KR); Hangyu Cho, Seoul (KR); Jinmin Kim, Seoul (KR); Eunsung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/751,447

(22) PCT Filed: Aug. 9, 2016

(86) PCT No.: PCT/KR2016/008739
§ 371 (c)(1),
(2) Date: Feb. 8, 2018

(87) PCT Pub. No.: WO2017/026769
PCT Pub. Date: Feb. 16, 2017

(65) Prior Publication Data
US 2018/0241597 A1    Aug. 23, 2018

Related U.S. Application Data

(60) Provisional application No. 62/265,427, filed on Dec. 10, 2015, provisional application No. 62/204,435, filed on Aug. 12, 2015.

(51) Int. Cl.
*H04L 27/20* (2006.01)
*H04L 1/00* (2006.01)
(Continued)

(52) U.S. Cl.
CPC ............ *H04L 27/2082* (2013.01); *H04L 1/00* (2013.01); *H04L 1/0004* (2013.01); *H04L 27/26* (2013.01); *H04W 84/12* (2013.01)

(58) Field of Classification Search
CPC ..... H04L 27/2082; H04L 1/0004; H04L 1/00; H04L 27/26; H04W 84/12
See application file for complete search history.

(56) References Cited

U.S. PATENT DOCUMENTS

2011/0129032 A1   6/2011  Batra et al.
2011/0299468 A1   12/2011  Van Nee et al.
(Continued)

OTHER PUBLICATIONS

PCT International Application No. PCT/KR2016//008739, Written Opinion of the International Searching Authority dated Nov. 30, 2016, 18 pages.

*Primary Examiner* — Jean B Corrielus
(74) *Attorney, Agent, or Firm* — Lee Hong Degerman Kang & Waimey

(57) ABSTRACT

Disclosed according to one embodiment of the present invention is a method whereby a first station (STA) transmits signals using dual carrier modulation (DCM) in a wireless LAN system, comprising: modulating HE-SIG B field information and/or data field information on a wireless frame transmitted by the first STA and transmitting same to a second STA, wherein in the case of modulating the HE-SIG B field information and/or the data field information in a BPSK mode, if a random symbol C1 among symbols modulated in the BPSK mode is mapped to a subcarrier K, a symbol formed by rotating the phase of the symbol C1 is mapped to a subcarrier K+N/2 in a repeating manner, wherein N corresponds to the number of subcarriers of a resource unit for transmitting the HE-SIG B field information and the data field information and K is a random integer equal to or less than N/2.

12 Claims, 18 Drawing Sheets

(51) Int. Cl.
*H04L 27/26* (2006.01)
*H04W 84/12* (2009.01)

(56) References Cited

U.S. PATENT DOCUMENTS

| | | |
|---|---|---|
| 2012/0198315 A1 | 8/2012 | Soliman et al. |
| 2015/0139205 A1 | 5/2015 | Kenney et al. |
| 2015/0215818 A1 | 7/2015 | Suh et al. |
| 2015/0312907 A1* | 10/2015 | Lee ................... H04L 27/2085 370/338 |
| 2016/0352552 A1* | 12/2016 | Liu ..................... H04B 1/7176 |
| 2017/0104553 A1* | 4/2017 | Liu ..................... H04L 1/0041 |
| 2017/0126447 A1* | 5/2017 | Yang ................... H04L 5/0023 |
| 2017/0207944 A1* | 7/2017 | Zhang .................. H04L 29/06 |

* cited by examiner

FIG. 13

| | B0 B1 | B2 | B3 | B4 B9 | B10 B12 | B13 B15 | B16 B18 | B19 B21 | B22 | B23 |
|---|---|---|---|---|---|---|---|---|---|---|
| Composite Name: | BW | Reserved | STBC | Group ID | \multicolumn{4}{l|}{NSTS/Partial AID} | TXOP PS NOT ALLOWED | Reserved |
| SU Name: | BW | Reserved | STBC | Group ID | SU NSTS | \multicolumn{3}{l|}{Partial AID} | TXOP PS NOT ALLOWED | Reserved |
| MU Name: | BW | Reserved | STBC | Group ID | MU[0] NSTS | MU[1] NSTS | MU[2] NSTS | MU[3] NSTS | TXOP PS NOT ALLOWED | Reserved |
| Bits: | 2 | 1 | 1 | 6 | 3 | 3 | 3 | 3 | 1 | 1 |

(a)

| | B0 | B1 | B2 | B3 | B4 | B5 | B6 | B7 | B8 | B9 | B10 B17 | B18 B23 |
|---|---|---|---|---|---|---|---|---|---|---|---|---|
| Composite Name: | Short GI | Short GI NSYM Disambiguation | SU/MU[0] Coding | LDPC Extra OFDM symbol | \multicolumn{4}{l|}{SU VHT-MCS/MU[1-3] Coding} | Beam-formed | Reserved | CRC | Tail |
| SU Name: | Short GI | Short GI NSYM Disambiguation | SU/MU[0] Coding | LDPC Extra OFDM symbol | \multicolumn{4}{l|}{SU VHT-MCS} | Beam-formed | Reserved | CRC | Tail |
| MU Name: | Short GI | Short GI NSYM Disambiguation | SU/MU[0] Coding | LDPC Extra OFDM symbol | MU[1] Coding | MU[2] Coding | MU[3] Coding | Reserved | Reserved | Reserved | CRC | Tail |
| Bits: | 1 | 1 | 1 | 1 | 1 | 1 | 1 | 1 | 1 | 1 | 8 | 6 |

(b)

FIG. 14
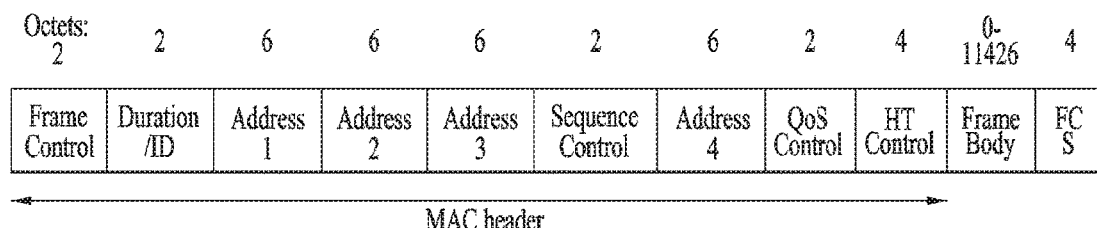
FIG. 15
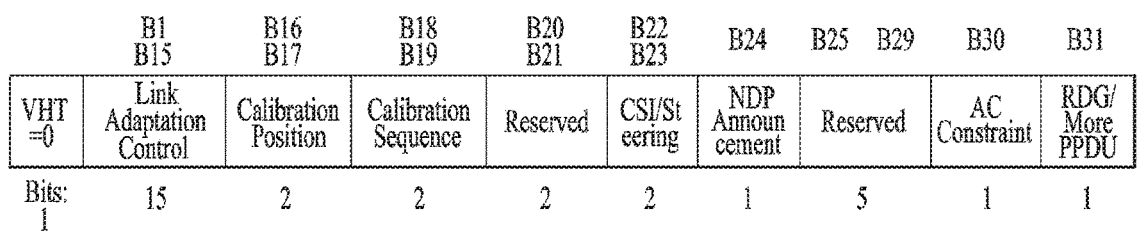
(a)
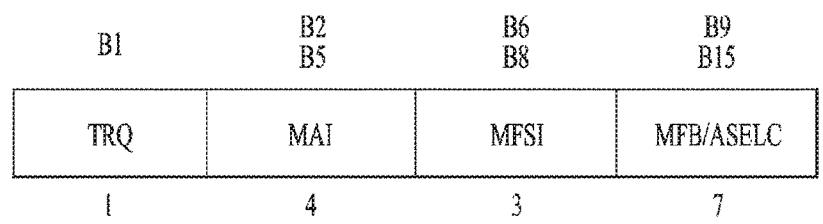
(b)

FIG. 16

| | B1 | B2 | B3 B5 | B6 B8 | B9 B23 | B24 B26 | B27 | B28 | B29 | B30 | B31 |
|---|---|---|---|---|---|---|---|---|---|---|---|
| | VHT=1 | Reserved | MRQ | MSI | MFSI/ GID-L | MFB | GID-H | Coding Type | FB Tx Type | Unsolicited MFB | AC Constraint | RDG/ More PPDU |
| Bits: | 1 | 1 | 1 | 3 | 3 | 15 | 3 | 1 | 1 | 1 | 1 | 1 |

(a)

| B9 B11 | B12 B15 | B16 B17 | B16 B23 |
|---|---|---|---|
| VHT N_STS | MCS | BW | SNR |
| 3 | 4 | 2 | 6 |

| | Frame Control | A1 | A2 | Sequence Control | A3 | A4 | Frame Body | FCS |
|---|---|---|---|---|---|---|---|---|
| Octets: | 2 | 2 or 6 | 6 or 2 | 0 or 2 | 0 or 6 | 0 or 6 | variable | 4 |

(a)

| | B0 B1 | B2 B4 | B5 B7 | B8 | B9 | B10 | B11 | B12 | B13 | B14 | B15 |
|---|---|---|---|---|---|---|---|---|---|---|---|
| | Protocol Version | Type | PTID/ Subtype | From DS | More Fragments | Power Managements | More Data | Protected Frame | End of Service Period | Relayed Frame | Ack Policy |
| Bits: | 2 | 3 | 3 | 1 | 1 | 1 | 1 | 1 | 1 | 1 | 1 |

| | | | | |
|---|---|---|---|---|
| 1 | Common Block for 20LR and 20RR | User Block [0] | User Block [1] | ... User Block [N-1] |
| 2 | Common Block for 20LL and 20RL | User Block [0] | User Block [1] | ... User Block [N-1] |
| 1 | Common Block for 20LR and 20RR | User Block [0] | User Block [1] | ... User Block [N-1] |
| 2 | Common Block for 20LL and 20RL | User Block [0] | User Block [1] | ... User Block [N-1] |

FIG. 20

| Common Block | User Block [0] | User Block [1] | CRC/Tail | ... | User Block [N-1] | CRC/Tail |
|---|---|---|---|---|---|---|

+ CRC/Tail, 1 BCC     1 BCC block for every K user blocks (+ CRC/tail)     Last BCC block may have less than K user blocks (+ CRC/tail)

METHOD FOR TRANSMITTING SIGNALS IN DCM MODE IN WIRELESS LAN SYSTEM, AND DEVICE FOR SAME

CROSS-REFERENCE TO RELATED APPLICATIONS

This application is the National Stage filing under 35 U.S.C. 371 of International Application No. PCT/KR2016/008739, filed on Aug. 9, 2016, which claims the benefit of U.S. Provisional Application No. 62/204,435, filed on Aug. 12, 2015, and 62/265,427, filed on Dec. 10, 2015, the contents of which are all hereby incorporated by reference herein in their entirety.

TECHNICAL FIELD

The present specification relates to a wireless LAN system, more particularly, to a method of transmitting a signal using DCM (Dual Carrier Modulation) in a wireless LAN system and an apparatus therefor.

BACKGROUND ART

A method of transmitting a frame proposed in the following can be applied to various wireless communication systems. In the following, a WLAN (wireless local area network) system is explained as an example of a system to which the present invention is applicable.

Standards for a Wireless Local Area Network (WLAN) technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

A radio frame currently discussed in IEEE 802.11ax standardization includes signaling fields and data fields. Among the signaling fields, in case of a signaling field (SIG B) including individual control information on each of a plurality of stations (STAs) and a data field, since information on a plurality of the STAs are included in the signaling field in a manner of being mixed, thereby deteriorating performance. It is necessary to prevent the performance deterioration.

DISCLOSURE OF THE INVENTION

Technical Task

A technical task of the present invention is to provide a method of transmitting a signal by performing modulation on a signaling field (SIG B) including individual control information on a plurality of stations (STAs) and a data field using a DCM scheme in a wireless LAN system and an apparatus therefor.

The present invention is not restricted by the aforementioned technical task and other technical tasks can be deducted from embodiments of the present invention.

Technical Solution

To achieve these and other advantages and in accordance with the purpose of the present invention, as embodied and broadly described, according to one embodiment, a method for a first station (STA) to transmit signals using a DCM (Dual Carrier Modulation) in a wireless local area network (WLAN) includes the steps of modulating one or more of a HE-SIG B field and a data field of a radio frame to be transmitted by the first STA, wherein, when the one or more of the HE-SIG B field and the data field are modulated by a BPSK scheme, a symbol, C1, of the BPSK modulated symbols is mapped to a subcarrier K and a phase shifted symbol of the symbol, C1, is repeatedly mapped to a subcarrier K+N/2, wherein the N corresponds to a number of resource units for transmitting the HE-SIG B field and the data field, and wherein the K is an integer equal to or less than the N/2; and transmitting the symbols mapped to the subcarriers to a second STA.

When the one or more of the HE-SIG B field and the data field are modulated by a QPSK scheme, a symbol, C2, of the QPSK modulated symbols is mapped to a subcarrier K and a conjugate of the symbol, C2, can be repeatedly mapped to the subcarrier K+N/2.

The phase shifted symbol of the symbol, C1, can be generated by multiplying a phase rotator to the symbol, C1. Specifically, the phase rotator may correspond to $\exp j(K+N/2)\pi$.

A HE-SIG A field of the radio frame can include an indicator indicating whether the DCM is applied to the HE-SIG B field and the data field.

The indicator may have 1 bit length, and the first STA can determine a modulation scheme for the one or more of the HE-SIG B field and the data field based on information on a MCS field and the indicator of the HE-SIG A field.

When the one or more of the HE-SIG B field and the data field are modulated by a BPSK scheme, each bit of the one or more of the HE-SIG B field and the data field is mapped to each of the BPSK modulated symbols, and the BPSK modulated symbols can be mapped to subcarriers at a lower half of the resource unit.

To further achieve these and other advantages and in accordance with the purpose of the present invention, according to a different embodiment, a station (STA) transmitting signals using a DCM (Dual Carrier Modulation) in a wireless local area network (WLAN) includes a processor configured to modulate one or more of a HE-SIG B field and a data field of a radio frame to be transmitted by the STA, and a transceiver configured to transmit symbols modulated by the processor to a different STA. In this case, when the one or more of the HE-SIG B field and the data field are modulated by a BPSK scheme, and a symbol, C1, of the BPSK modulated symbols is mapped to a subcarrier K, the processor is configured to repeatedly map a phase shifted symbol of the symbol, C1, to a subcarrier K+N/2, the N corresponds to a number of resource units for transmitting the HE-SIG B field and the data field, and the K is an integer equal to or less than the N/2.

When the one or more of the HE-SIG B field and the data field are modulated by a QPSK scheme, and a symbol, C2, of the QPSK modulated symbols is mapped to a subcarrier K, the processor can be configured to repeatedly map a conjugate of the symbol, C2, to the subcarrier K+N/2.

The processor can generate the phase shifted symbol of the symbol, C1, by multiplying a phase rotator to the symbol, C1.

The phase rotator may correspond to exp j(K+N/2) π.

The processor can be configured to make a HE-SIG A field of the radio frame have an indicator indicating whether the DCM is applied to the HE-SIG B field and the data field.

The indicator has 1 bit length, and the processor can determine a modulation scheme for the one or more of the HE-SIG B field and the data field based on information on a MCS field and the indicator of the HE-SIG A field.

When the one or more of the HE-SIG B field and the data field are modulated by a BPSK scheme, the processor can be configured to map each bit of the one or more of the HE-SIG B field and the data field to each of the BPSK modulated symbols, and the BPSK modulated symbols can be mapped to subcarriers at a lower half of the resource unit.

Advantageous Effects

According to one embodiment of the present invention, it is able to prevent performance deterioration of an SIG B field and a data field of a radio frame in which information on a plurality of STAs are mixed.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIGS. 9 to 13 are diagrams for explaining an example of a frame structure used in IEEE 802.11 system.

FIGS. 14 to 16 are diagrams illustrating a MAC frame format.

FIG. 17 is a diagram illustrating a short MAC frame format.

FIG. 19 is a diagram for explaining a scheme of transmitting HE-SIG B in a broadband according to one embodiment of the present invention.

FIG. 20 is a diagram illustrating a case of performing grouping-based encoding on a user specific field of HE SIG B according to one embodiment of the present invention and FIG. 21 is a diagram illustrating a case of performing encoding on a user specific field of HE SIG B according to a user in accordance with one embodiment of the present invention.

BEST MODE

Mode for Invention

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Figure 1:
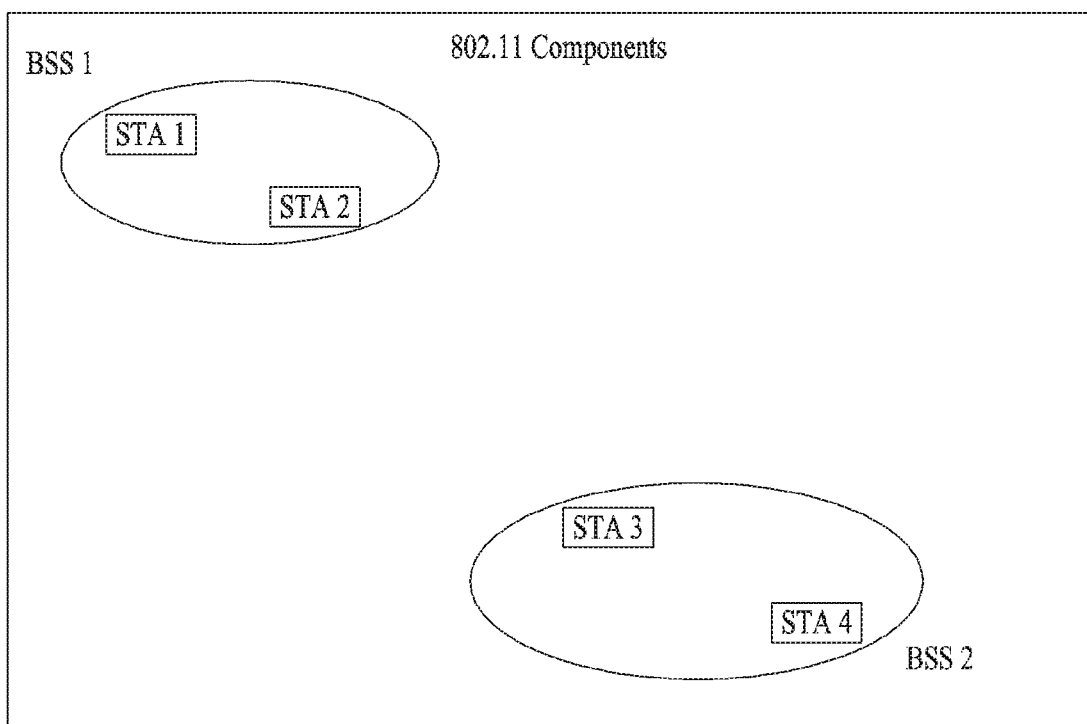
FIG. 1 is a diagram illustrating an exemplary configuration of a WLAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
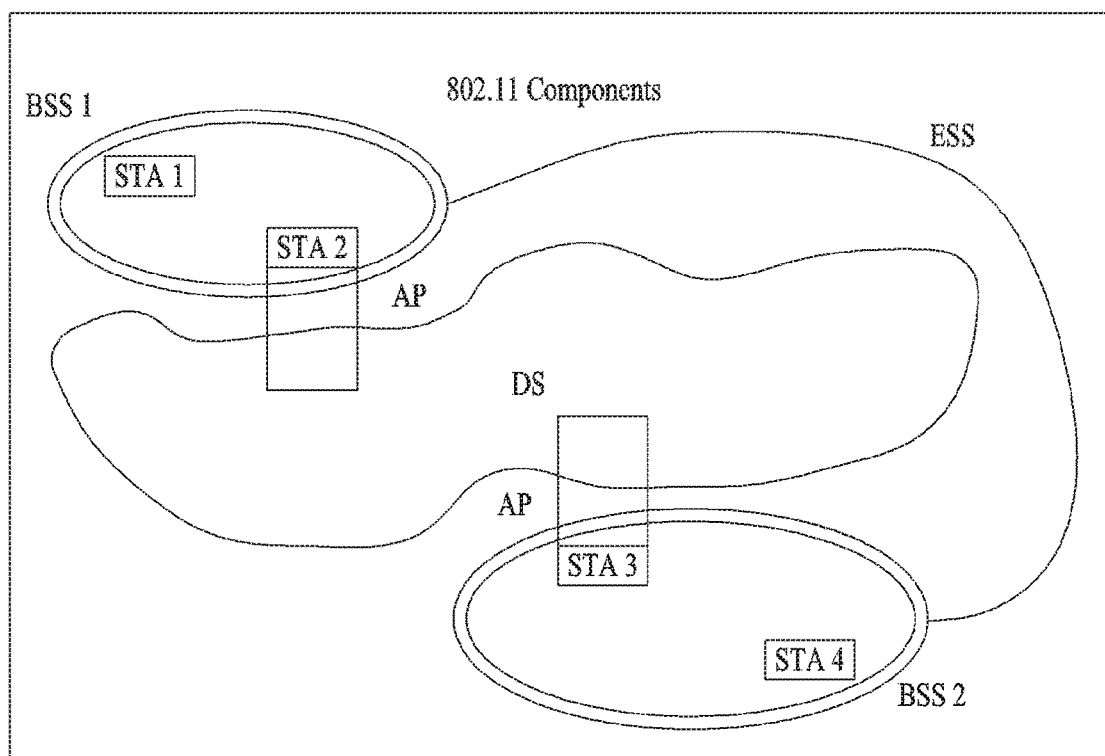
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Figure 3:
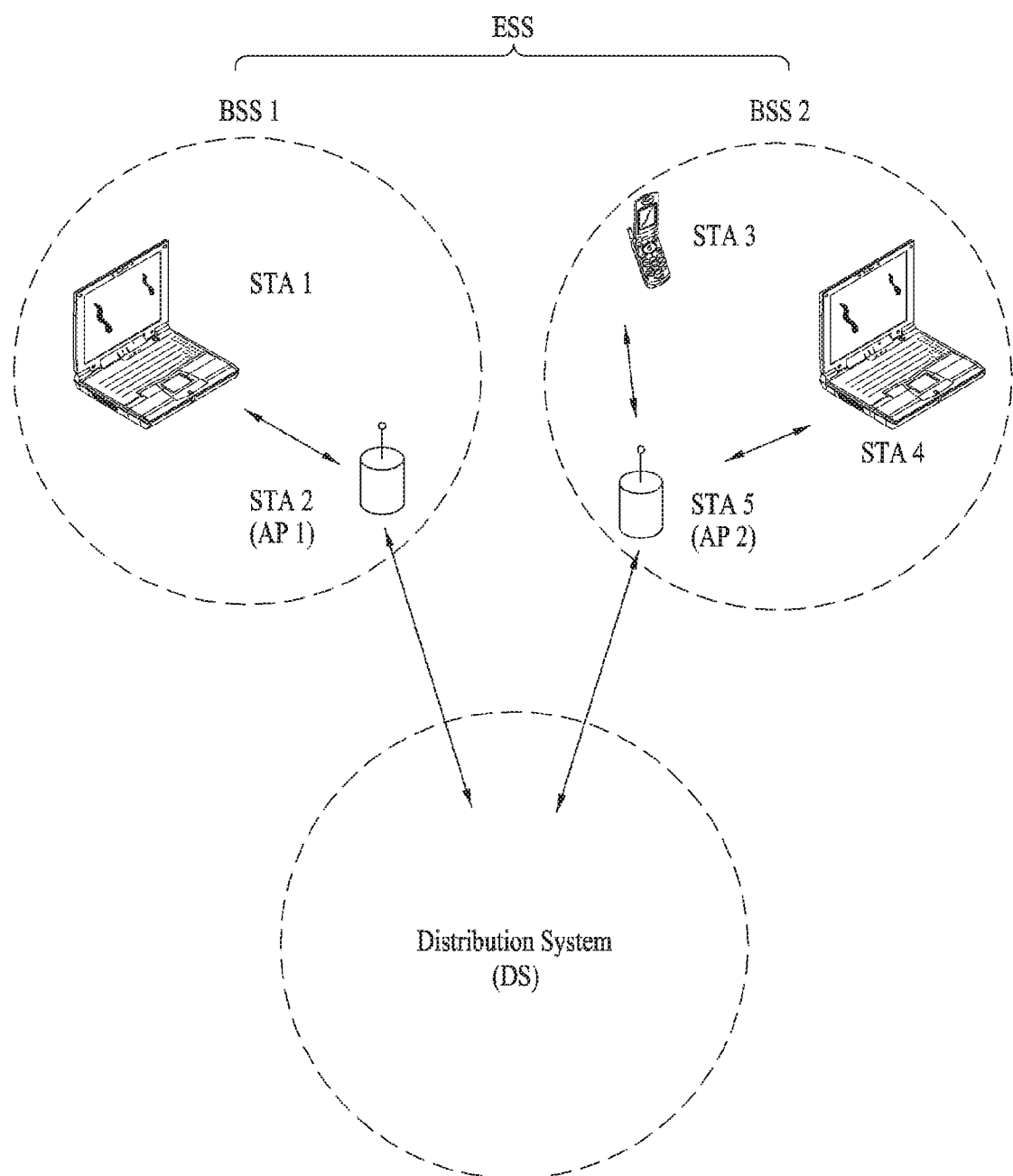
FIG. 3 is a diagram for an exemplary configuration of a WLAN system.

FIG. 3 is a diagram for an exemplary configuration of a WLAN system. FIG. 3 shows an example of a base structure BSS including a DS.

According to an example shown in in FIG. 3, a BSS1 and a BSS 2 construct an ESS. In a WLAN system, an STA corresponds to a device operating according to MAC/PHY regulation of IEEE 802.11. An STA includes an AP STA and a non-AP STA. In general, the non-AP STA corresponds to such a device directly handled by a user as a laptop computer, a mobile phone and the like. In the example of FIG. 3, an STA 1, an STA 3 and an STA 4 correspond to the non-AP STA and an STA 2 and an STA 5 correspond to the AP STA.

In the following description, the non-AP STA may be referred to as a terminal, a WTRU (wireless transmit/receive unit), a UE (user equipment), an MS (mobile station), a mobile terminal, an MSS (mobile subscriber station) and the like. And, an AP is a concept corresponding to a BS (base station), a Node-B, an eNB (evolved Node-B), a BTS (base transceiver system), a femto BS, and the like in a different wireless communication field.

Figure 4:
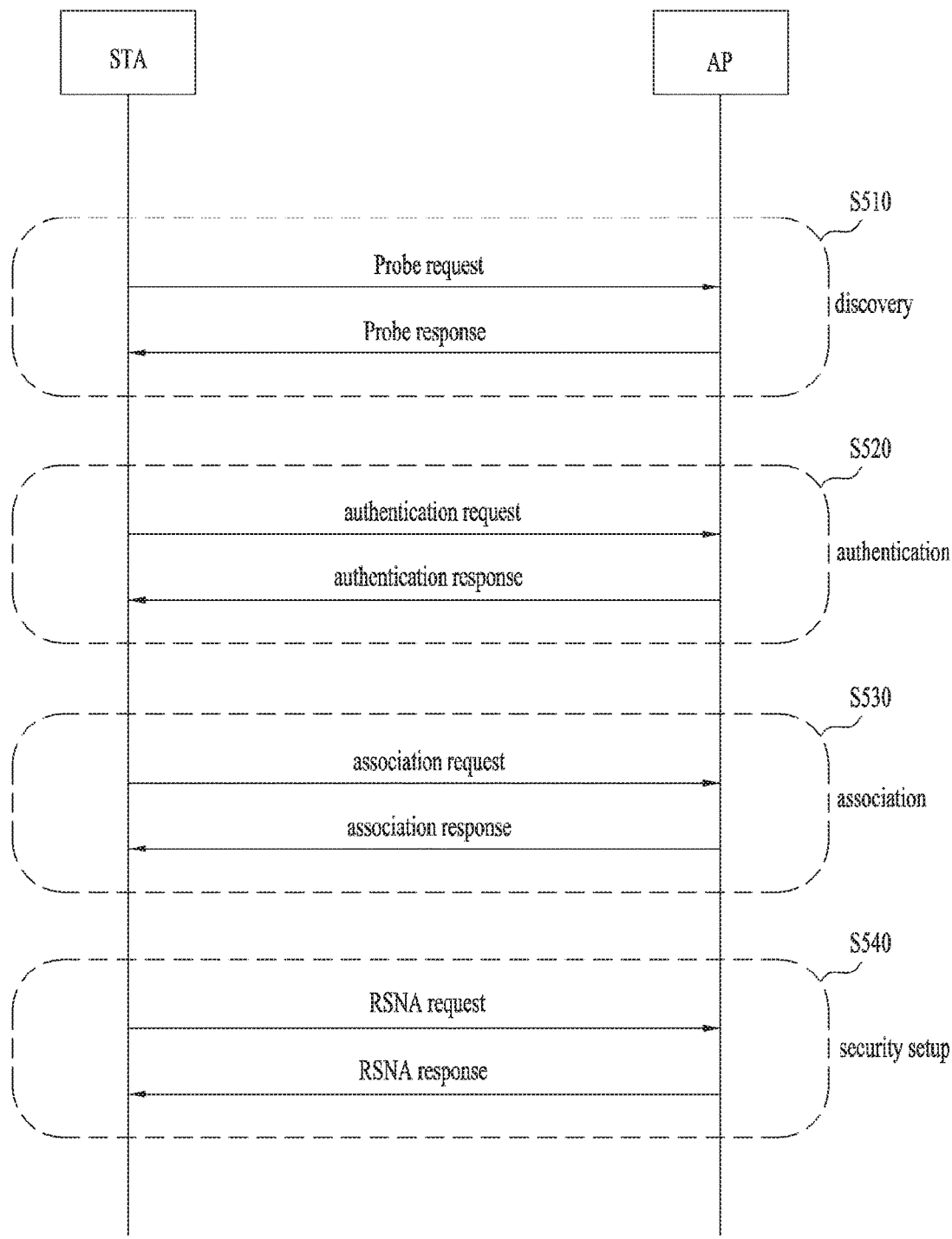
FIG. 4 is a diagram for explaining a general link setup procedure.
Figure 5:
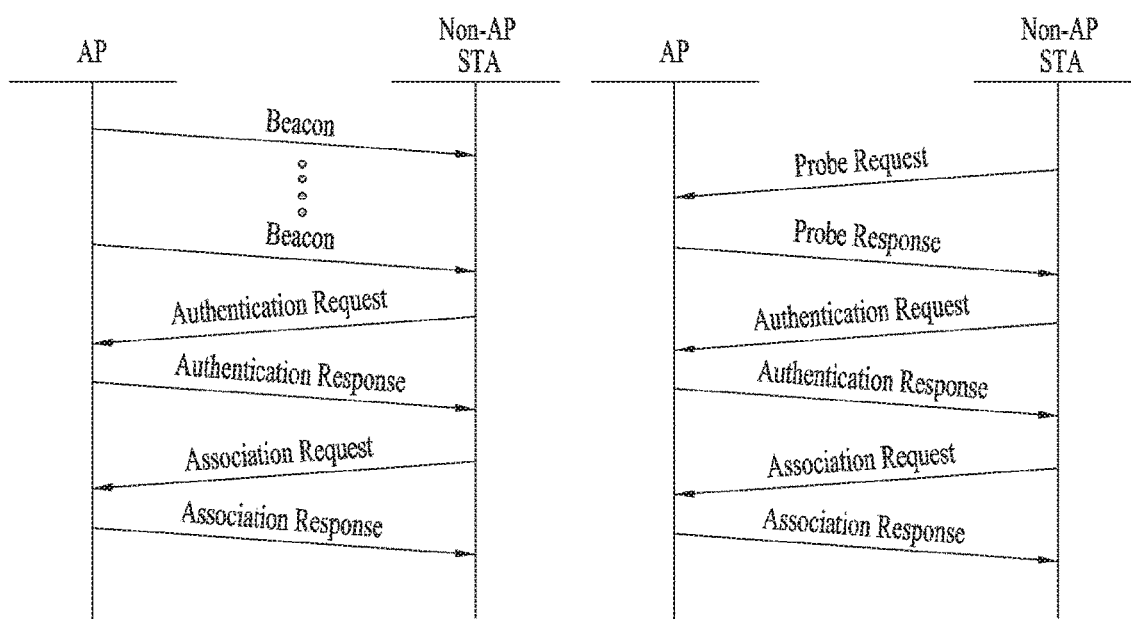
FIG. 5 is a diagram for explaining an active scanning method and a passive scanning method.

FIG. 4 is a diagram for explaining a general link setup procedure and FIG. 5 is a diagram for explaining an active scanning method and a passive scanning method.

In order for an STA to setup a link with a network and transceive data with the network, it is necessary for the STA to firstly discover the network, perform authentication, establish an association, and perform an authentication procedure for security and the like. A link setup procedure can also be referred to as a session initiation procedure or a session setup procedure. And, discovery of the link setup procedure, authentication, association, and security setting procedure can be commonly referred to as an association procedure.

An exemplary link setup procedure is explained with reference to FIG. 4.

In the step S410, an STA can perform a network discovery operation. The network discovery operation can include a scanning operation of the STA. In particular, in order for the STA to access a network, it is necessary to find out a network in which the STA is able to participate. An STA should identify a compatible network before the STA participates in a wireless network. A procedure of identifying a network existing at a specific region is referred to as scanning.

A scanning scheme includes active scanning and passive scanning Although FIG. 4 shows a network discovery operation including an active scanning procedure for example, the network discovery operation can operate as a passive scanning procedure.

According to the active scanning procedure, an STA performing scanning transmits a probe request frame to discover an AP existing near the STA while changing channels and waits for a response in response to the probe request frame. A responder transmits a probe response frame to the STA, which has transmitted the probe request frame, in response to the probe request frame. In this case, the responder may correspond to an STA, which have finally transmitted a beacon frame in a BSS of a scanning channel. Since an AP transmits the beacon frame in the BSS, the AP becomes the responder. However, since a beacon frame is alternately transmitted by STAs in an IBSS, a responder is not fixed. For example, if an STA transmits a probe request frame on a first channel and receives a probe response frame on the first channel, the STA stores BSS-related information included in the received probe response frame and may be then able to perform scanning (i.e., transmit and receive probe request/response on a second channel) using an identical method by moving to a next channel (e.g., second channel).

Referring to FIG. 5, a scanning operation can be performed using a passive scanning scheme. In the passive scanning, STAs performing the scanning wait for a beacon frame while moving around channels. The beacon frame corresponds to one of management frames in IEEE 802.11. The beacon frame is periodically transmitted to notify the existence of a wireless network and make an STA performing scanning discover the wireless network and participate in the wireless network. An AP performs a role of periodically transmitting the beacon frame in a BSS and STAs belonging to an IBSS alternately transmit the beacon frame in the IBSS. Having received the beacon frame, the STA performing scanning stores information on a BSS included in the beacon frame and records beacon frame information at each channel while moving to a different channel. Having received the beacon frame, the STA stores BSS-related information included in the beacon frame, moves to a next channel, and may be then able to perform scanning at the next channel using an identical method.

If the active scanning and the passive scanning are compared with each other, the active scanning has a merit in that delay and power consumption are less compared to the passive scanning.

After the network is discovered by the STA, an authentication procedure can be performed in the step S420. In order to clearly distinguish the authentication procedure from a security setup operation described in the step S440, the authentication procedure can be referred to as a first authentication procedure.

An authentication procedure includes procedures that an STA transmits an authentication request frame to an AP and the AP transmits an authentication response frame to the STA in response to the authentication request frame. An authentication frame used for authentication request/response corresponds to a management frame.

An authentication frame can include information on an authentication algorithm number, an authentication transaction sequence number, a status code, a challenge text, an RSN (robust security network), a finite cyclic text, and the like. The aforementioned information corresponds to a part of information capable of being included in the authentication request/response frame. The information can be replaced with other information or additional information can be further included in the information.

The STA can transmit the authentication request frame to the AP. The AP can determine whether to permit authentication for the STA based on information included in the received authentication request frame. The AP can provide a result of the authentication process to the STA via the authentication response frame.

After the STA is successfully authenticated, an association procedure can be performed in the step S430. The association procedure includes procedures that the STA transmits an association request frame to the AP and the AP transmits an association response frame to the STA in response to the association response frame.

For example, the association request frame can include information on various capabilities, information on a beacon listening interval, information on an SSID (service set identifier), information on supported rates, information on supported channels, information on an RSN, information on a mobility domain, information on supported operating class, information on a TIM (traffic indication map) broadcast request, information on interworking service capability, and the like.

For example, the association response frame can include information on various capabilities, information on a status code, information on an AID (association ID), information on supported rates, information on an EDCA (enhanced distributed channel access) parameter set, information on an RCPI (received channel power indicator), information on an RSNI (received signal to noise indictor), information on a mobility domain, information on a timeout interval (association comeback time), information on an overlapping BSS scan parameter, information on a TIM broadcast response, information on a QoS map, and the like.

The aforementioned information corresponds to a part of information capable of being included in the association request/response frame. The information can be replaced with other information or additional information can be further included in the information.

After the STA is successfully associated with the network, a security setup procedure can be performed in the step S540. The security setup procedure of the step S440 may correspond to an authentication procedure authenticated via an RSNA (robust security network association) request/response, the authentication procedure of the step S520 may correspond to a first authentication procedure, and the security setup procedure of the step S540 can be simply referred to as an authentication procedure.

The security setup procedure of the step S540, for example, can include a procedure for performing private key setup via 4-way handshaking through an EAPOL (extensible authentication protocol over LAN) frame. And, the security setup procedure can also be performed according to a security scheme not defined in IEEE 802.11 standards.

Figure 6:
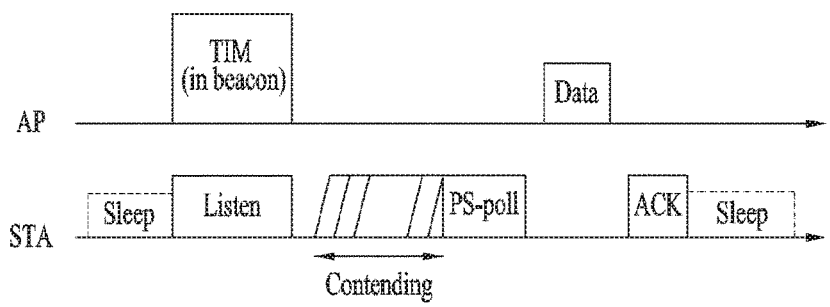
FIGS. 6 to 8 are diagrams for explaining an operation of a station which has received TIM.
Figure 7:
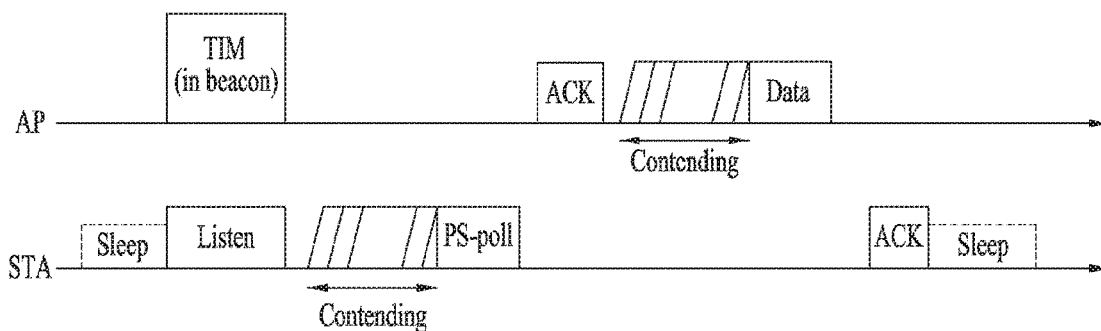
Figure 8:
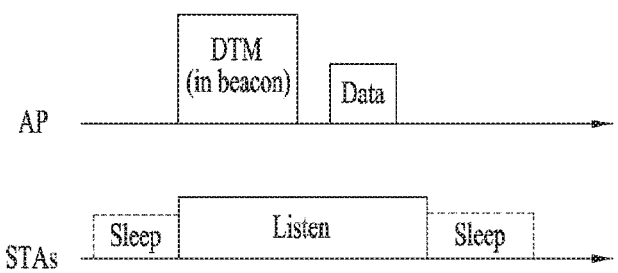
Figure 9:
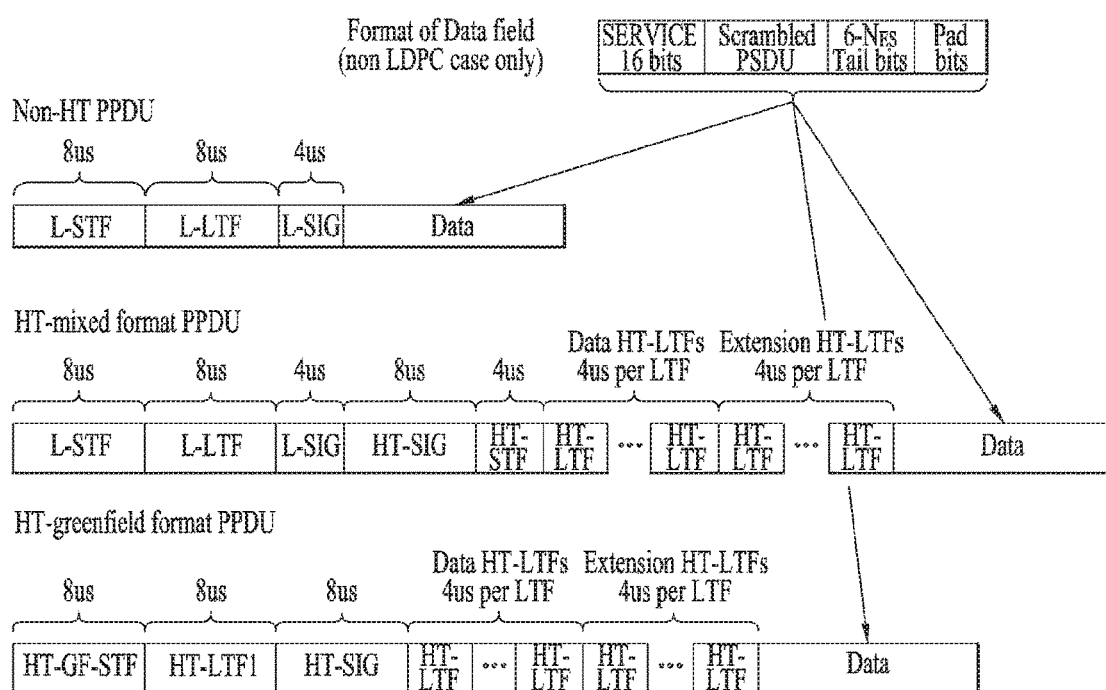

FIGS. 6 to 8 are diagrams for explaining an operation of a station which has received TIM.

Referring to FIG. 6, an STA switches to an awake state from a sleep state to receive a beacon frame including a TIM (traffic indication map) from an AP. The STA interprets the received TIM element and may be then able to know that there is buffered traffic to be transmitted to the STA. The STA performs contention with other STAs to access a media for transmitting a PS-poll frame and may be then able to transmit the PS-poll frame to the AP to make a request for transmission of a data frame. Having received the PS-poll frame from the STA, the AP can transmit a frame to the STA. The STA receives a data frame from the AP and may be then able to transmit a confirmation response (ACK) to the AP in response to the data frame. Subsequently, the STA may switch to the sleep state again.

As shown in FIG. 6, having received the PS-poll frame from the STA, the AP may operate according to an immediate response scheme transmitting a data frame after a prescribed time (e.g., SIFS (short inter-frame space)). Meanwhile, if the AP fails to prepare a data frame to be transmitted to the STA during the SIFS time after the PS-poll frame is received from the STA, the AP may operate according to a deferred response scheme. Regarding this, it is explained with reference to FIG. 7.

Referring to an example of FIG. 7, similar to the example of FIG. 6, an STA switches to an awake state from a sleep state, receives a TIM from an AP, and transmits a PS-poll frame to the AP via contention. After the PS-poll frame is received, if the AP fails to prepare a data frame during SIFS, the AP can transmit an ACK frame to the STA instead of the data frame. After the ACK frame is transmitted, if the data frame is ready, the AP can transmit the data frame to the STA after contention is performed. The STA transmits an ACK frame indicating that the data frame is successfully received to the AP and may switch to the sleep state.

FIG. 8 is a diagram for an example that an AP transmits a DTIM. STAs can switch to an awake state from a sleep state to receive a beacon frame including a DTIM element from an AP. The STAs are able to know that a multicast/broadcast frame is to be transmitted via the received DTIM. The AP can transmit a data (i.e., multicast/broadcast frame) without an operation of transmitting and receiving a PS-poll frame after the beacon frame including the DTIM is transmitted. After the beacon frame including the DTIM is received, the STAs receive data while continuously maintaining the awake state. After the data reception is completed, the STAs can switch to the sleep state again.

FIGS. 9 to 13 are diagrams for explaining an example of a frame structure used in IEEE 802.11 system.

A station (STA) can receive a PPDU (physical layer convergence protocol (PLCP) packet data unit). In this case, a PPDU frame format can be configured in a manner of including an STF (short training field), an LTF (long training field), an SIG (signal) field, and a data field. In this case, as an example, the PPDU frame format can be configured based on a type of the PPDU frame format.

For example, a non-HT (high throughput) PPDU frame format can be configured by an L-STF (legacy-STF) field, an L-LTF (legacy-LTF) field, an SIG field, and a data field only.

And, the type of the PPDU frame format can be configured by either a HT-mixed format PPDU or a HT-greenfield format PPDU. In this case, the aforementioned PPDU format can further include an additional (a different type of) STF, LTF, and an SIG field between the SIG field and the data field.

Figure 10:
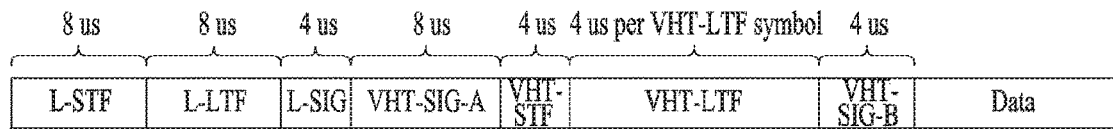

Referring to FIG. 10, it may be able to configure a VHT (very high throughput) PPDU format. In this case, the VHT PPDU format can further include an additional (a different type of) STF, LTF, and an SIG field between the SIG field and the data field. More specifically, the VHT PPDU format can include at least one selected from the group consisting of a VHT-SG-A field, a VHT-STF field, a VHT-LTF field, and a VHT-SIG-B field between the L-SIG field and the data field.

In this case, the STF may correspond to a signal for signal detection, AGC (automatic gain control), diversity selection, minute time synchronization, and the like. And, the LTF may correspond to a signal for channel estimation, frequency error estimation, and the like. In this case, the STF and the LTF can be commonly referred to as a PCLP preamble. The PCLP preamble may correspond to a signal for performing OFDM physical layer synchronization and channel estimation.

Figure 11:
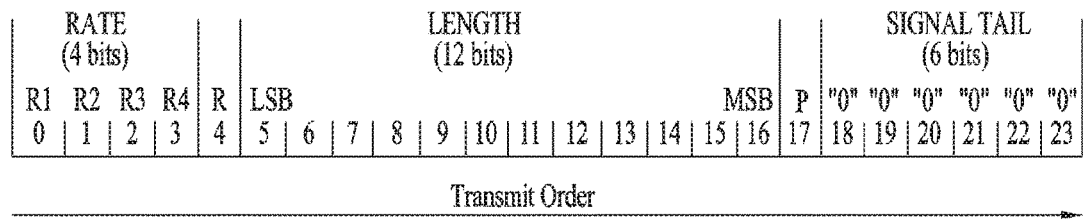

Referring to FIG. 11, the SIG field can include a RATE field, a LENGTH field, and the like. The RATE field can include information on modulation and a coding rate of a data. The LENGTH field can include information on a data length. In addition, the SIG field can include a parity bit, an SIG TAIL bit, and the like.

The data field can include a SERVICE field, a PSDU (PLCP service data unit), a PPDU TAIL bit. If necessary, the data field can further include a padding bit.

Figure 12:
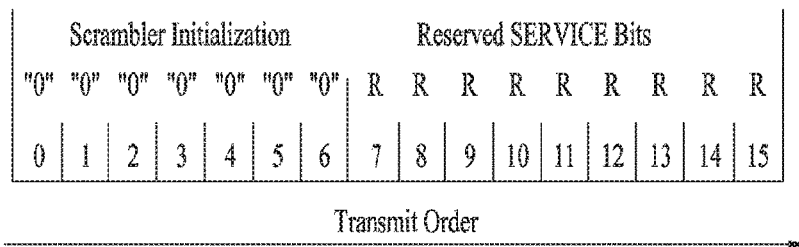

In this case, referring to FIG. 12, a partial bit of the SERVICE field can be used for synchronization of a descrambler in a receiving end and a partial bit can be configured by a reserved bit. The PSDU corresponds to a MAC PDU (protocol data unit) defined in a MAC layer and can include data generated/used in a higher layer. The PPDU TAIL bit can be used for returning an encoder to a zero state. The padding bit can be used for matching a length of a data field with a prescribed unit.

And, as mentioned in the foregoing description, the VHT PPDU format can include an additional (or a different type of) STF, LTF, and an SIG field. In this case, L-STF, L-LTF, and L-SIG may correspond to a part of non-VHT in the VHT PPDU. In this case, VHT-SIG A, VHT-STF, VHT-LTF, and VHT-SIG may correspond to a part of VHT in the VHT PPDU. In particular, a field for the non-VHT and a region for the VHT field can be respectively defined in the VHT PPDU. In this case, for example, the VHT-SIG A can include information for interpreting the VHT PPDU.

In this case, for example, referring to FIG. 13, the VHT-SIG A can be configured by VHT SIG-A1 (FIG. 13 (a)) and VHT SIG-A2 (FIG. 13(b)). In this case, each of the VHT SIG-A1 and the VHT SIG-A2 can be configured by 24 data bits and the VHT SIG-A1 can be transmitted prior to the VHT SIG-A2. In this case, the VHT SIG-A1 can include a BW field, an STBC field, a group ID field, an NSTS/partial AID field, a TXOP_PS_NOT_ALLOWED field, and a reserved field. And, the VHT SIG-A2 can include a short GI field, a short GI NSYM disambiguation field, an SU/MU[0] coding field, an LDPC extra OFDM symbol field, an SU VHT-MCS/MU[1-3] coding field, a beamformed field, a CRC field, a tail field, and a reserved field. Through the aforementioned fields, it may be able to check information on the VHT PPDU.

FIGS. 14 to 16 are diagrams illustrating an MAC frame format.

A station is able to receive a PPDU based on one of the aforementioned PPDU formats. In this case, a PSDU of a data part of a PPDU frame format can include a MAC PDU. In this case, the MAC PDU is defined according to various MAC frame formats. A basic MAC frame can include a MAC header, a frame body, and a FCS (frame check sequence).

In this case, for example, referring to FIG. 14, the MAC header can include a frame control field, a duration/ID field, an address field, a sequence control field, a QoS control field, an HT control sub field, and the like. In this case, the frame control field of the MAC header can include control information necessary for transmitting and receiving a frame. The duration/ID field can be configured by time necessary for transmitting a corresponding frame. And, the address field can include identification information on a sender and a receiver. Regarding this, it shall be described later. For the sequence control field, the QoS control field, and the HT control field, it may refer to IEEE 802.11 standard document.

In this case, for example, the HT control field may have two forms including HT variant and VHT variant. In this case, information included in the HT control field may vary according to each form of the HT control field. Referring to FIGS. 15 and 16, a VHT subfield of the HT control field may indicate a form of the HT control field among the HT variant and the VHT variant. In this case, for example, if the VHT subfield has a value of '0', it may indicate the HT variant form. If the VHT subfield has a value of '1', it may indicate the VHT variant form.

In this case, for example, referring to FIG. 15, if the HT control field has the HT variant form, the HT control field can include a link adaptation control field, a calibration position field, a calibration sequence field, a CSI/steering field, an HT NDP announcement field, an AC constraint field, an RDG/more PPDU field, and a reserved field. In this case, for example, referring to FIG. 15(b), the link adaptation control field can include a TRQ field, an MAI field, an MFSI field, and an MFB/ASELC field. For more details, it may refer to IEEE 802.11 standard document.

And, for example, referring to FIG. 16, if the HT control field has the VHT variant form, the HT control field can include an MRQ field, an MSI field, an MFSI/GID-LM field, an MFB GID-H field, a coding type field, an FB Tx type field, an unsolicited MFB field, an AC constraint field, an RDG/more PPDU field, and a reserved field. In this case, for example, referring to FIG. 16(b), the MFB field can include a VHT N_STS field, an MCS field, a BW field, an SNR field, and the like.

FIG. 17 is a diagram illustrating a short MAC frame format. A MAC frame can be configured in a form of a short MAC frame to prevent waste of a radio resource by reducing unnecessary information according to necessity. In this case, for example, referring to FIG. 17, a frame control field, an A1 field, and an A2 field can be always included in an MAC header of a short frame. And, a sequence control field, an A3 field, and an A4 field can be optionally included in the MAC header of the short frame. By doing so, it is able to prevent waste of a radio resource by omitting information not required by the MAC frame.

In this case, for example, the frame control field of the MAC header can include a Protocol version field, a Type field, a PTID/subtype field, a From DS field, a More fragment field, a Power management field, a More data field, a Protected frame field, an End of service period field, a Relayed frame field, and an Ack policy field, and the like. For contents of each sub field of the frame control field, it may refer to IEEE 802.11 standard document.

Meanwhile, the Type field of the frame control field of the MAC header is configured by 3 bits. Values ranging from 0 to 3 include a configuration for each of address information and values ranging from 4 to 7 can be reserved. In relation to this, according to the present invention, new address information can be indicated via a reserved value. Regarding this, it shall be described later.

And, the From DS field of the control frame field of the MAC header can be configured by 1 bit.

Besides, the More fragment field, the Power management field, the More data field, the Protected frame field, the End of service period field, the Relayed frame field, and the Ack policy field can be configured by 1 bit. In this case, the Ack policy field corresponds to ACK/NACK information and can be configured by 1 bit.

In relation to stations including a frame configured by the aforementioned form, a VHT AP (access point) station can support a non-AP VHT station operating in a TXOP (transmit opportunity) power save mode in a BSS. In this case, for example, the non-AP VHT station is in an active state and may operate in the TXOP power save mode. In this case, the AP VHT station can make the non-AP VHT station switch to an inactive state (doze) during TXOP. For example, the AP VHT station sets TXOP_PS_NOT_ALLOWED corresponding to a TXVECTOR parameter to 0 and transmits VHT PPDU to indicate that the non-AP VHT station is switched to the inactive state. In this case, parameters included in the TXVECTOR, which are transmitted by the AP VHT station together with the VHT PPDU, can be maintained in a manner of being changed to 0 from 1 during the TXOP. By doing so, it may be able to perform power saving during the remaining TXOP.

On the contrary, if the TXOP_PS_NOT_ALLOWED is set to 1 and power saving is not performed, the parameters included in the TXVECTOR can be maintained without being changed.

And, as mentioned in the foregoing description, if the non-AP VHT station is switched to the inactive state during the TXOP in the TXOP power save mode, it may be able to satisfy the following conditions.

A case of receiving VHT MU PPDU, i.e., a case that a station is not indicated as a group member by a group_ID corresponding to RXVECTOR parameter A case of receiving SU PPDU, i.e., a case that PARTI-AL_AID (RXVECTOR parameter) of a station is not 0 or is not matched with a partial AID of the station A case that an address of a receiver belonging to a MAC header is not matched with a MAC address of a station although it is determined as PARTIAL_AID (RXVECTOR parameter) of the station is matched with a partial AID of the station A case of setting NUM_STS (RXVECTOR parameter) to 0 although a station is indicated as a group member by GROUP_ID corresponding to RXVECTOR parameter A case of receiving VHT NDP announcement frame, a case of setting PARTIAL_AID (RXVECTOR parameter) of a station to 0, and a case that AID belonging to Info field of the station is not matched A case of setting More Data field of a station to 0, a case that Ack Policy subfield receives a frame configured as No Ack, and a case that Ack Policy subfield transmits ACK in a state not corresponding to No Ack.

In this case, AP VHT station can include a Duration/ID value configured by the remaining TXOP duration and NAV-SET sequence (e.g., RTS/CTS). In this case, the AP VHT station may not transmit a frame to a non-AP VHT station which is switched to inactive state based on the aforementioned condition during the remaining TXOP.

And, for example, if the AP VHT station sets TXOP_PS_NOT_ALLOWED corresponding to a TXVECTOR parameter to 0 and transmits the parameter in an identical TXOP and the AP VHT station wants a station not to be changed to an inactive state from an active state, the AP VHT station may not transmit VHT SU PPDU.

And, for example, the AP VHT station may not transmit a frame to a VHT station switched to the inactive state before NAV configured at the time of starting TXOP is expired.

In this case, when the More data field is set to 0, if the AP VHT station transmits a frame including at least one selected from the group consisting of MSDU, A-MSDU, and MMPDU and fails to receive ACK in response to the frame, the frame can be retransmitted at least one more time in an identical TXOP. In this case, for example, if it fails to receive ACK in the last frame of the identical TXOP in response to the retransmission of the frame, the frame can be retransmitted after waiting until a next TXOP.

And, for example, the AP VHT station may be able to receive a BlockAck frame from a VHT station operating in a TXOP power save mode. In this case, the BlockAck frame may correspond to a response for A-MPDU including MPDU of which the More Data field is set to 0. In this case, since the AP VHT station is in an inactive state, it may be difficult for the AP VHT station to receive a response of a subsequence of the MPDU, which is retransmitted during the identical TXOP.

And, it is able to make a VHT station, which is operating in a TXOP power save mode and is switched to an inactive state, operate during a state that a NAV timer is inactive. In this case, for example, if the timer is expired, the VHT station can be switched to the awake state.

And, if the NAV timer is expired, the station can perform contention to access a medium.

HE PPDU Format

Although a frame structure for IEEE 802.11ax has not been determined yet, it may be able to anticipate it as follows.

Figure 18:
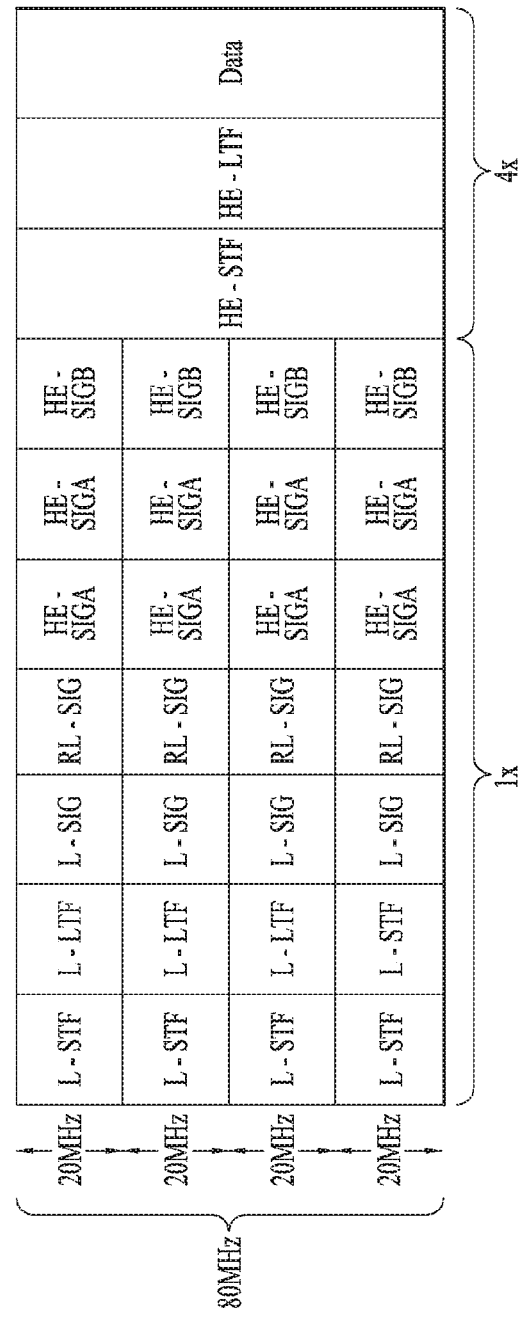
FIG. 18 is a diagram for an example of a HE (high efficiency) PPDU format according to one embodiment of the present invention.

FIG. 18 is a diagram illustrating an example of a HE (high efficiency) PPDU format according to one embodiment of the present invention.

Similar to the frame structure shown in FIG. 18, 11ax maintains a legacy 1× symbol structure (3.2 us) until HE-SIG (SIG-A, SIG-B). HE-preamble and a data part can use a frame structure including 4× symbol (12.8 us) structure. Of course, unless it is directly contrary to the following description, although the aforementioned structure is changed, the present invention can be applied without any problem.

L-part may follow L-STF, L-LTF, and L-SIG configurations according to a form maintained in a legacy WiFi system as it is. In general, it is preferable for the L-SIG to deliver packet length information. HE-part corresponds to a part newly configured for 11ax standard (high efficiency). HE-SIG (HE-SIGA and HE-SIGB) may exist between the L-part and HE-STF and may be able to notify common control information and user specific information. Specifically, the HE-SIG can include HE-SIF-A for delivering the common control information and HE-SIG B for delivering the user specific information.

The HE-SIG-B can be omitted when single user transmission is performed.

The HE SIG B can include a common field and a user specific field. The HE SIG B can be transmitted in a broadband equal to or wider than 40 MHz using a scheme described in the following.

FIG. 19 is a diagram for explaining a scheme of transmitting HE-SIG B in a broadband according to one embodiment of the present invention.

In general, in case of performing encoding in a broadband equal to or wider than 40 MHz, the HE-SIG B can transmit independent information in two 20 MHz bands adjacent to each other in the 40 MHz band. And, control information transmitted via the 40 MHz band can be transmitted in a manner of being duplicated in an adjacent 40 MHz band.

In FIG. 19, '1' or '2' is used to distinguish control information transmitted via one 20 MHz band from control information transmitted via another 20 MHz band in the 40 MHz band. As shown in FIG. 19, the control information can be transmitted in a manner of being duplicated in a unit of 40 MHz.

As shown in FIG. 19, HE-SIG B includes a common field for transmitting common control information and a user specific field for transmitting user-specific information. The user specific filed can include a plurality of blocks according to the number of users.

Meanwhile, a structure of the HE SIG B performing encoding according to each 20 MHz band may follow one of methods described in the following.

Figure 21:
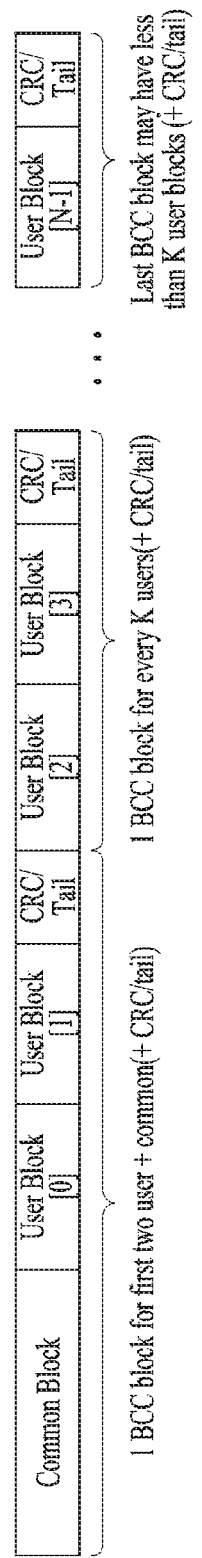

FIG. 20 is a diagram illustrating a case of performing grouping-based encoding on a user specific field of HE SIG B according to one embodiment of the present invention and FIG. 21 is a diagram illustrating a case of performing encoding on a user-specific field of HE SIG B according to a user in accordance with one embodiment of the present invention.

Specifically, referring to FIG. 20, block coding (BCC) is performed on common information of the HE-SIG B using a single block and CRC/tail bit is added to the common information. And, the user-specific field performs grouping on the 'K' (where, K is a natural number equal to or greater than 2) number of users and a single user block is formed according to a user (STA) on which the grouping is performed.

On the contrary, referring to FIG. 21, the user-specific field of the HE-SIG B forms a single block according to a user without performing the grouping. In some cases, as shown in FIG. 21, it may be able to form a single block including common control information and partial UE-specific information.

In the foregoing examples, whether a CRC is added according to a user whether a CRC is added according to a user group, or whether a CRC is added together with common information and user information can be differently determined depending on a situation.

Figure 22:
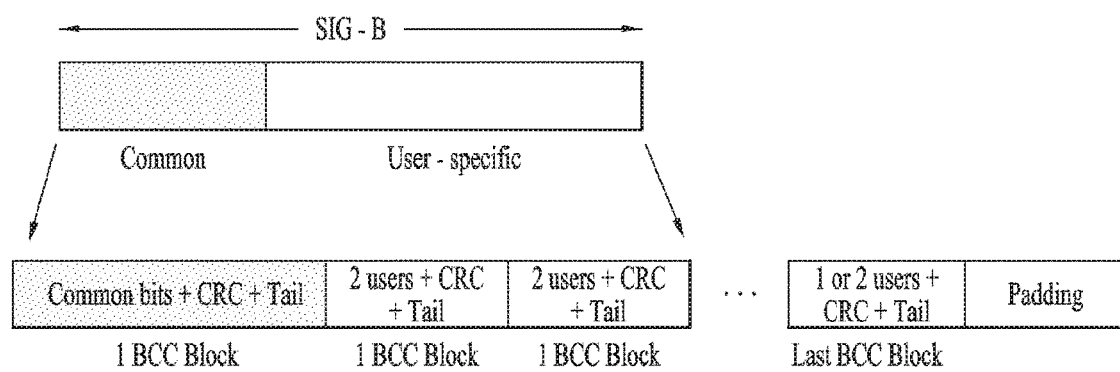
FIG. 22 is a diagram illustrating a method of configuring HE SIG B in a specific 20 MHz band according to one embodiment of the present invention.

FIG. 22 is a diagram illustrating a method of configuring HE SIG B in a specific 20 MHz band according to one embodiment of the present invention.

As mentioned earlier in FIG. 20, grouping can be performed on a user specific field in a unit of a plurality of users. FIG. 22 shows an example of performing grouping on two users. The example of FIG. 22 shows a case that each block of the user specific field separately includes a CRC and tails bits.

Meanwhile, as mentioned in the foregoing description, if grouping-based encoding is performed on the user specific field, as shown in FIG. 22, a single block including control information on the remaining STA not included in the grouping may exist. As mentioned in the following description, it may be able to insert padding bits for aligning time domain after the single block.

HE-SIG-B information encoded by the encoding structure shown in FIGS. 20 to 22 can be interleaved in a unit of a symbol (i.e., NCBPS: the number of coded bits per OFDM symbol). Hence, as mentioned in the foregoing embodiments, if informations on a plurality of STAs are encoded in a manner of being grouped, it may be difficult to mix encoded information bits with each other.

When a channel state is poor, for example, when an impact of outdoor and interference is strong, if a signal is transmitted using, since the HE-SIG-B and data are distorted, it is difficult to receive the signal.

Hence, in order to increase reliability of the HE-SIG-B, one embodiment of the present invention proposes to use SQPSK/DCM (dual carrier modulation).

Figure 23:
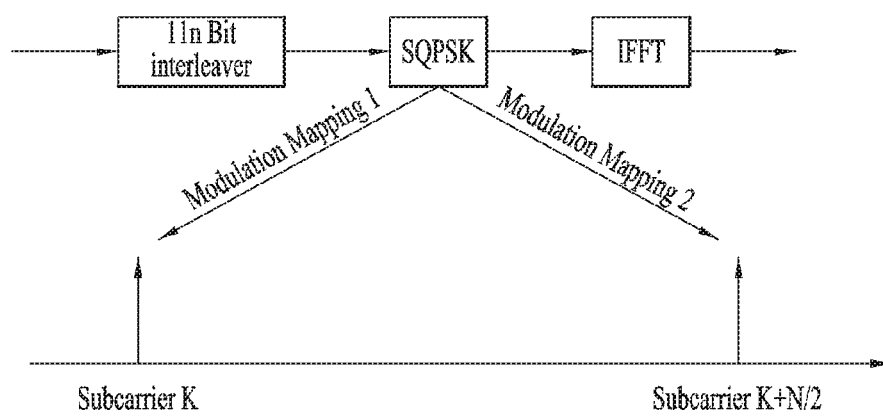
FIG. 23 is a diagram for explaining an SQPSK scheme to be used in the present invention.

FIG. 23 is a diagram for explaining an SQPSK scheme to be used in the present invention.

In case of performing SQPSK modulation, input bits can be divided into $N_{CBPS}$ bits—$(c_0^{(q)}, c_1^{(q)}, K, c_{N_{CBPS}-1}^{(q)})$. In this case, such a bit pair as $(c_{2k}^{(q)}, c_{2k+1}^{(q)})$, $k=0,1,K$, $N_{CBPS}/2-1$ can be converted into a complex constellation point such as $$d_k^{(q)} = \frac{1}{\sqrt{2}}((2c_{2k}^{(q)} - 1) + j(2c_{2k+1}^{(q)} - 1)).$$

In particular, it may be able to generate a constellation point for the half of OFDM subcarriers. A bit pair can be converted into $d_{P(k)}^{(q)} = \mathrm{conj}(d_k^{(q)})$ for $k=0, 1, \ldots, N_{CBPS}/2-1$ for other subcarriers. In this case, P(k) has a range ranging from $N_{CBPS}/2$ to $N_{CBPS}-1$.

Yet, as mentioned earlier with reference to FIG. 23, in case of applying the SQPSK, a modulation scheme is restricted to QPSK. Hence, a preferred embodiment of the present invention proposes a scheme capable of obtaining better performance while maintaining the same transfer rate when a legacy robust MCS is used to transmit HE-SIG B and/or a data field.

Figure 24:
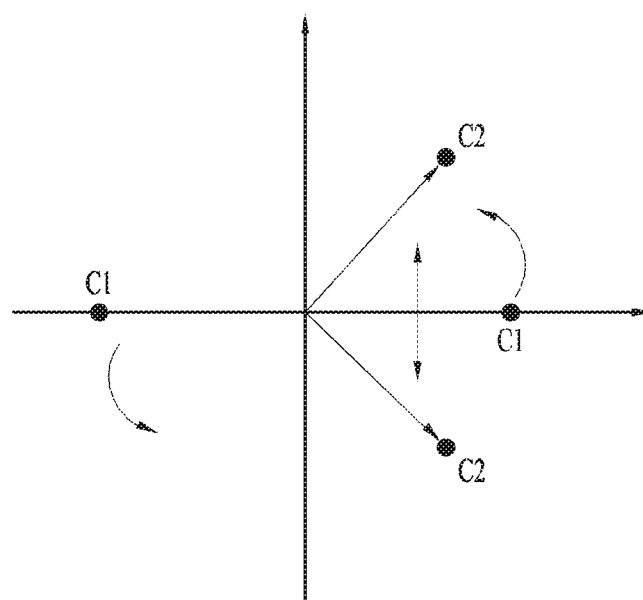
FIG. 24 is a diagram for explaining a method of performing BPSK modulation using DCM according to a preferred embodiment of the present invention.

FIG. 24 is a diagram for explaining a method of performing BPSK modulation using DCM according to a preferred embodiment of the present invention.

According to one embodiment of the present invention, it may use BPSK rather than QPSK as a modulation scheme to increase reliability. For example, if information bits of HE-SIG B and/or a data field correspond to b1, b2, b3, b4, . . . , the information bits can be respectively mapped to symbols c1, c2, c3, c4, . . . using the BPSK modulation scheme. In the following, a random symbol among the symbols c1, c2, c3, c4, . . . is represented by C1. Specifically, in the abovementioned relation, bit information and symbol information can be represented as C1=2*B1-1. Hence, as shown in FIG. 24, the C1 can be located at a real-number axis on a complex plane.

Meanwhile, as mentioned earlier with reference to FIG. 23, when SQPSK is used, if a modulation symbol corresponds to C2, the C2 can be mapped to a constellation point shown in FIG. 24 using the QPSK modulation. As mentioned earlier with reference to FIG. 23, if the C2 is mapped to a subcarrier K, SQPSK can be implemented in a manner of repeatedly mapping a conjugate complex number of the C2 to K+N/2. On the contrary, in case of using BPSK, it is difficult to obtain an effect of phase rotation using a conjugate complex number.

Hence, when bit information is modulated via BPSK according to one embodiment of the present invention, unlike the SQPSK scheme, each symbol is multiplied by a phase rotation factor to rotate a phase and a phase-rotated symbol is repeatedly transmitted to a subcarrier K+N/2. In this case, N can be determined according to a FFT size, N_CBPS, number of available carriers, or the like.

For example, a symbol (C1') mapped to the subcarrier K+N/2 can be expressed as follows.

$$C1'=C1*\exp j(K+N/2) \qquad \text{[Equation 1]}$$

As mentioned in the foregoing description, a DCM transmission scheme using BPSK can also be referred to as SPBSK.

Meanwhile, according to a different embodiment of the present invention, RSQPSK is proposed as a scheme that a symbol is repeated in a time axis while using QPSK.

In case of using SQPSK, since frequency diversity is used in a symbol, if informations on a plurality of STAs are transmitted in a manner of being grouped, reliability can be degraded. Hence, in order to obtain a diversity gain in the aspect of time as well as frequency, an SQPSK symbol generated by the aforementioned method is repeatedly transmitted to obtain a time diversity gain.

In the foregoing description, the repeated SQPSK symbol may correspond to the same symbol or a symbol that conj(SQPSK) or a phase is evenly changed.

In particular, if SQPSK symbol is repeatedly transmitted, since it is able to obtain a diversity gain in the aspect of time as well as frequency, it may have better performance compared to a legacy method.

Figure 25:
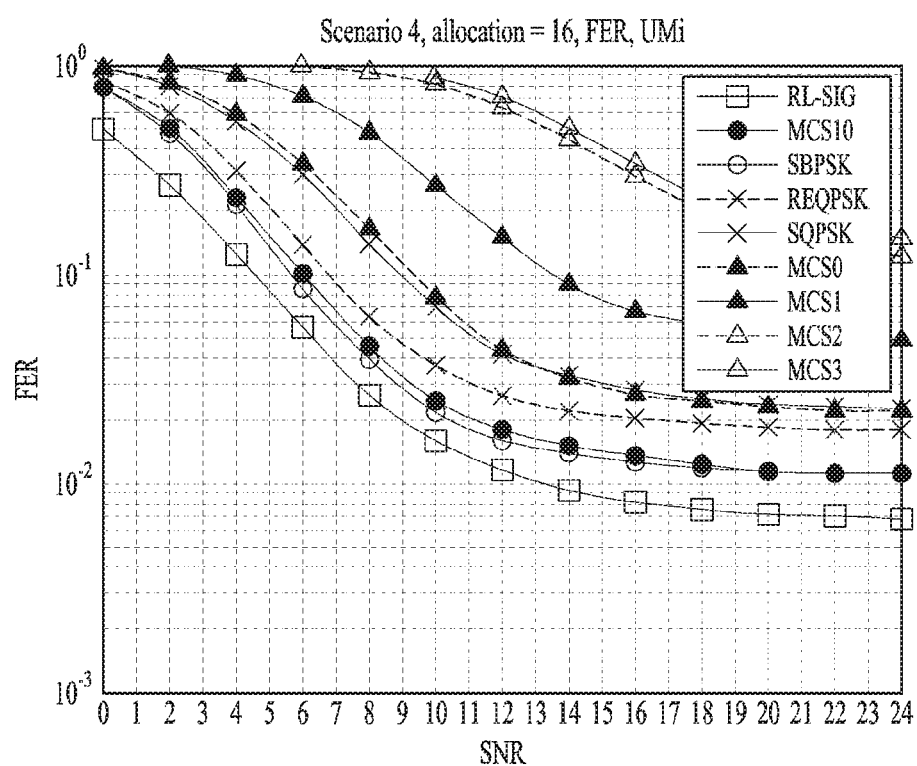
FIG. 25 is a diagram for explaining performance of a transmission scheme according to each embodiment of the present invention.

FIG. 25 is a diagram for explaining performance of a transmission scheme according to each embodiment of the present invention.

The scheme mentioned earlier with reference to FIG. 23 corresponds to SQPSK and the scheme mentioned earlier with reference to FIG. 24 corresponds to SBPSK. Moreover, the scheme of repeatedly transmitting a symbol in time domain while using the SQPSK corresponds to RSQPSK.

As shown in FIG. 25, in case of using the SBPSK scheme, it is able to see that a smaller FER appears in the same SNR situation.

Meanwhile, in case of using the abovementioned scheme, a method of signaling a modulation scheme and the like is explained in the following.

The proposed robust transmission method can be represented using HE-SIG-B MCS information of HE-SIG-A or a combination between MCS information and an additional specific indicator. For example, when a specific indicator of 1-bit is configured for the robust transmission method, if the indicator bit is set to 1, specific MCS indication of a legacy MCS table indicated by an MCS field can be recognized as robust MCS. For example, when MCS information bits transmitted using HE-SIG-A corresponds to 00 and a specific indicator of 1 bit for the robust transmission method is set to 0, it can be recognized as MCS0. If the specific indicator of 1 bit for the robust transmission method is set to 1, it can be recognized as the aforementioned SBPSK.

As a different method, it may configure MCS for the robust transmission method, add the MCS to a legacy MCS table, and configure an MCS table. The MCS table can be transmitted via HE-SIG-A.

Figure 26:
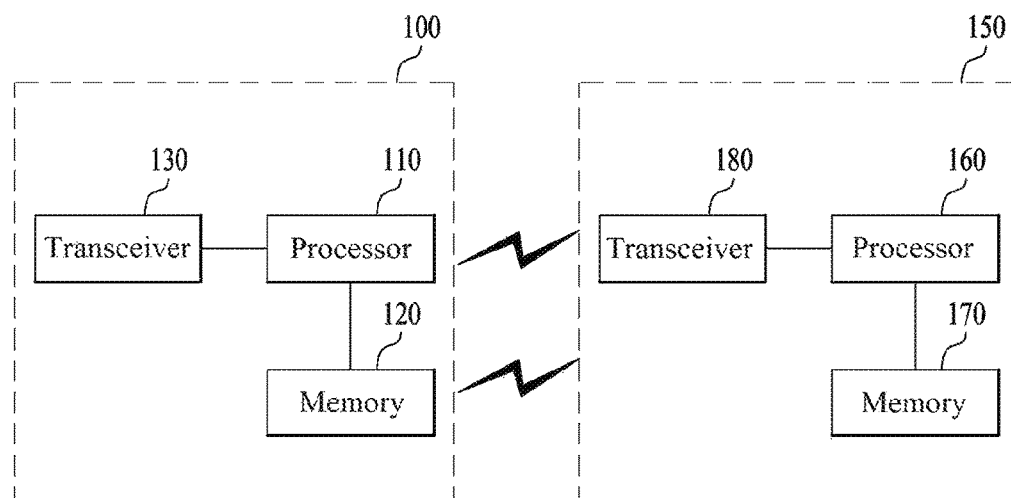
FIG. 26 is a block diagram for an exemplary configuration of an AP (or a base station) and an STA (or a UE) according to one embodiment of the present invention.

FIG. 26 is a block diagram for an exemplary configuration of an AP (or a base station) and an STA (or a UE) according to one embodiment of the present invention.

An AP 100 can include a processor 110, a memory 120, and a transceiver 130. An STA 150 can include a processor 160, a memory 170, and a transceiver 180.

The transceiver 130/180 can transmit/receive a radio signal and implement a physical layer according to IEEE 802 system. The processor 110/160 is connected with the transceiver 130/180 and can implement a physical layer and/or a MAC layer according to IEEE 802 system. The processor 110/160 is configured to perform an operation according to one or a combination of two or more embodiments of the present invention. A module for implementing operations of the AP and the STA according to the various embodiments of the present invention is stored in the memory 120/170 and the module can be executed by the processor 110/160. The memory 120/170 can be connected with the processor 110/160 via a well-known media in a manner of being included in the processor 110/160 or being installed in the outside of the processor 110/160.

Explanation on the AP 100 and explanation on the STA 150 can be respectively applied to a base station and a user equipment in a different wireless communication system (e.g., LTE/LTE-A system).

The configurations of the AP and the STA as described above may be implemented such that the above-described embodiments can be independently applied or two or more thereof can be simultaneously applied, and description of redundant parts is omitted for clarity.

Figure 27:
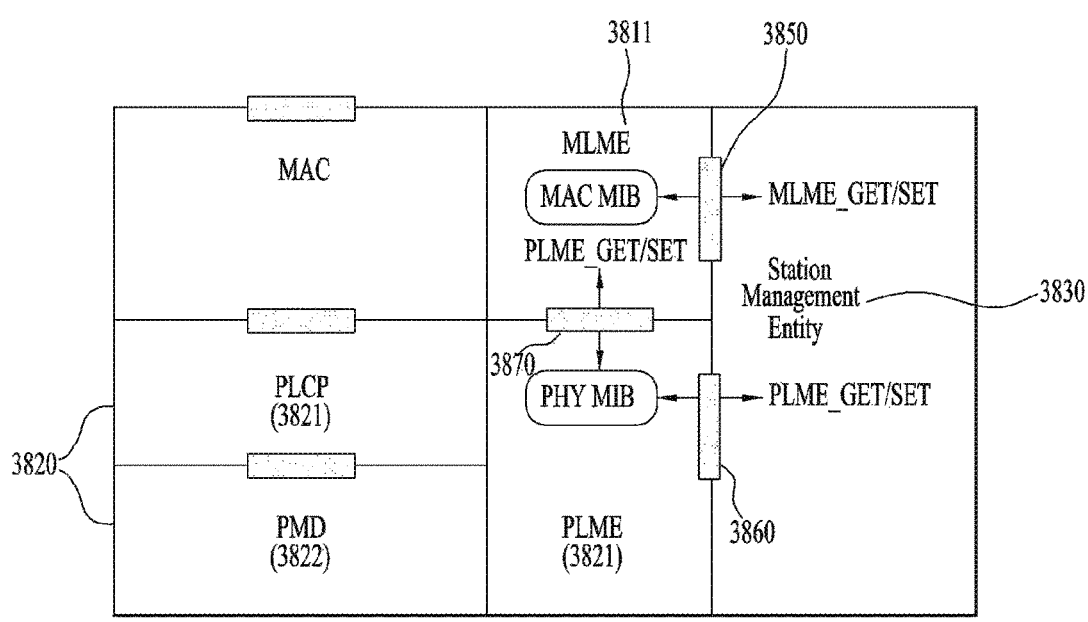
FIG. 27 is a diagram for an exemplary configuration of a processor of an AP or an STA according to one embodiment of the present invention.

FIG. 27 is a diagram for an exemplary configuration of a processor of an AP or an STA according to one embodiment of the present invention.

A processor of an AP or an STA may have a structure of a plurality of layers. FIG. 27 mainly shows a MAC sublayer 3810 and a physical layer 3820 on a DLL (data link layer) among a plurality of the layers. As shown in FIG. 27, the PHY 3820 can include a PLCP (physical layer convergence procedure) entity 3821 and a PMD (physical medium dependent) entity 3822. Both the MAC sublayer 3810 and the PHY 3820 include management entities conceptually referred to as an MLME (MAC sublayer management entity) 3811. The entities 3811/3821 provide a layer management service interface in which a layer management function is operating.

In order to provide a precise MAC operation, an SME (station management entity) 3830 exists in each STA. The SME 3830 corresponds to a layer-independent entity capable of exiting in a separate management plane or capable of being seen as a separate entity (off to the side). Although precise functions of the SME 3830 are not explained in detail in the present specification, the entity 3830 is in charge of collecting lay-dependent status from various layer management entities and similarly configuring values of layer-specific parameters. In general, the SME 3830 performs the aforementioned functions on behalf of a general system management entity and may be able to implement a standard management protocol.

The entities shown in FIG. 27 interact with each other using various schemes. FIG. 27 shows several examples of exchanging GET/SET primitives. XX-GET.request is used to request a value of a given MIB attribute (management information-based attribute information). If status corresponds to "success", XX-GET.confirm primitive returns an appropriate MIB attribute information value. Otherwise, the XX-GET.confirm primitive is used to return an error indication to a status field. XX-SET.request primitive is used to request that an indicated MIB attribute is configured by a given value. If the MIB attribute corresponds to a specific operation, it indicates that the MIB attribute requests to perform the specific operation. If status corresponds to "success", XX-SET.confirm primitive confirms that an MIB attribute is configured by a requested value. Otherwise, the XX-SET.confirm primitive is used to return an error condition to a status field. If the MIB attribute corresponds to a specific operation, it confirms that the specific operation has been performed.

As shown in FIG. 27, the MLME 3811 and the SME 3830 can exchange various MLME_GET/SET primitives with each other via an MLME_SAP 3850. And, various PLCM_GET/SET primitives can be exchanged between the PLME 3821 and the SME 3830 via a PLME_SAP 3860 and can be exchanged between the MLME 3811 and the PLME 3821 via a MLME-PLME_SAP 3870.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein. The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

And, both an apparatus invention and a method invention are explained in the present specification and the explanation on the both of the inventions can be complementally applied, if necessary.

INDUSTRIAL APPLICABILITY

As mentioned in the foregoing description, embodiments of the present invention can be applied to various wireless communication systems including IEEE 802.11 system.

What is claimed is:

1. A method for a first station (STA) to transmit signals based on a Dual Carrier Modulation (DCM) in a wireless local area network (WLAN), the method comprising:
    modulating the signals for at least one of a High Efficiency-Signaling (HE-SIG) B field or a data field of a radio frame to be transmitted by the first STA based on a Binary Phase Shift Keying (BPSK) scheme;
    mapping a symbol (C1) of BPSK modulated symbols to a subcarrier K and repeatedly mapping a phase shifted symbol of the symbol (C1) to a subcarrier K+N/2,
    wherein N corresponds to a number of resource units for transmitting the signals for the at least one of the HE-SIG B field or the data field, and wherein K is an integer equal to or less than N/2; and
    transmitting the modulated symbols mapped to the subcarriers to a second STA.

2. The method according to claim 1, wherein the phase shifted symbol of the symbol (C1) is generated by multiplying a phase rotator to the symbol (C1).

3. The method according to claim 2, wherein the phase rotator corresponds to exp j(K+N/2)π.

4. The method according to claim 1, wherein a HE-SIG A field of the radio frame includes an indicator indicating whether the DCM is applied to the signals for the at least one of the HE-SIG B field or the data field.

5. The method according to claim 4, wherein the indicator has 1 bit length, and wherein the first STA determines the BPSK scheme for the signals based on information on a Modulation and Coding Scheme (MCS) field and the indicator of the HE-SIG A field.

6. The method according to claim 1, further comprising:
    mapping each bit of the signals to each of the BPSK modulated symbols, and wherein the BPSK modulated symbols are mapped to subcarriers at a lower half of the resource units.

7. A station (STA) transmitting signals based on a Dual Carrier Modulation (DCM) in a wireless local area network (WLAN), the STA comprising:
    a processor configured to modulate the signals for at least one of a High Efficiency-Signaling (HE-SIG) B field or a data field of a radio frame to be transmitted by the STA based on a Binary Phase Shift Keying (BPSK) scheme; and
    a transceiver configured to transmit symbols modulated by the processor to a different STA,
    wherein the processor is further configured to:
    map a symbol (C1) of BPSK modulated symbols to a subcarrier K and repeatedly map a phase shifted symbol of the symbol (C1) to a subcarrier K+N/2,
    wherein N corresponds to a number of resource units for transmitting the signals for the at least one of the HE-SIG B field or the data field, and wherein K is an integer equal to or less than N/2.

8. The STA according to claim 7, wherein the processor is configured to generate the phase shifted symbol of the symbol (C1) by multiplying a phase rotator to the symbol (C1).

9. The STA according to claim 8, wherein the phase rotator corresponds to exp j(K+N/2) π.

10. The STA according to claim 7, wherein the processor is configured to make a HE-SIG A field of the radio frame have an indicator indicating whether the DCM is applied to the signals for the at least one of the HE-SIG B field or the data field.

11. The STA according to claim 10, wherein the indicator has 1 bit length, and wherein the processor is configured to determine the BPSK scheme for the signals based on information on a Modulation and Coding Scheme (MCS) field and the indicator of the HE-SIG A field.

12. The STA according to claim 7, wherein the processor is further configured to:
    map each bit of the signals to each of the BPSK modulated symbols, and wherein the BPSK modulated symbols are mapped to subcarriers at a lower half of the resource unit.

* * * * *